(12) United States Patent
Miyamoto et al.

(10) Patent No.: US 7,729,917 B2
(45) Date of Patent: Jun. 1, 2010

(54) CORRECTION OF A CAPTION PRODUCED BY SPEECH RECOGNITION

(75) Inventors: Kohtaroh Miyamoto, Fuchu (JP); Kenichi Arakawa, Inagi (JP); Toshiya Ohgane, Chofu (JP)

(73) Assignee: Nuance Communications, Inc., Burlington, MA (US)

( * ) Notice: Subject to any disclaimer, the term of this patent is extended or adjusted under 35 U.S.C. 154(b) by 521 days.

(21) Appl. No.: 11/688,939

(22) Filed: Mar. 21, 2007

(65) Prior Publication Data

US 2008/0040111 A1   Feb. 14, 2008

(30) Foreign Application Priority Data

Mar. 24, 2006   (JP) .............................. 2006-082126

(51) Int. Cl.
*G10L 21/00* (2006.01)
(52) U.S. Cl. ........................................ 704/270; 704/275
(58) Field of Classification Search ................ 704/270, 704/270.1, 275
See application file for complete search history.

(56) References Cited

U.S. PATENT DOCUMENTS

| | | | |
|---|---|---|---|
| 6,393,398 B1 | 5/2002 | Imai et al. | |
| 6,571,210 B2 * | 5/2003 | Hon et al. | 704/251 |
| 7,130,790 B1 * | 10/2006 | Flanagan et al. | 704/2 |
| 2001/0005825 A1 * | 6/2001 | Engelke et al. | 704/235 |
| 2001/0025241 A1 * | 9/2001 | Lange et al. | 704/235 |
| 2002/0016712 A1 * | 2/2002 | Geurts et al. | 704/275 |

(Continued)

FOREIGN PATENT DOCUMENTS

JP   06141240 A   5/1994

(Continued)

OTHER PUBLICATIONS

Ando et al. "Real-time transcription system for simultaneous subtitling of Japanese broadcast news programs", IEEE Trans. on broadcasting, vol. 46, No. 3, Sep. 2000.*

(Continued)

*Primary Examiner*—Richemond Dorvil
*Assistant Examiner*—Jialong He
(74) *Attorney, Agent, or Firm*—Wolf, Greenfield & Sacks, P.C.

(57) ABSTRACT

A device of the present invention obtains a character string of a speech recognition result and a confidence factor thereof. A time monitor monitors time and determines whether or not processing is delayed by checking the confidence factor and time status. When the processing is not delayed, a checker is asked to perform manual judgment. In this event, speech is processed and the manual judgment of the speech recognition result is performed on the basis of the processed speech. When the processing is delayed, automatic judgment is performed by use of the confidence factor. When the character string is judged to be correct as a result of the manual judgment or the automatic judgment, the character string is displayed as a confirmed character string. When the character string is judged to be incorrect, automatic correction is performed by matching on the basis of a next candidate obtained by the speech recognition, texts and attributes of the presentation, a script text, and the like. Character string after the automatic correction is displayed as an unconfirmed character string.

3 Claims, 9 Drawing Sheets

U.S. PATENT DOCUMENTS

| | | | |
|---|---|---|---|
| 2002/0143531 A1* | 10/2002 | Kahn | 704/235 |
| 2004/0024601 A1* | 2/2004 | Gopinath et al. | 704/270 |
| 2004/0093220 A1* | 5/2004 | Kirby et al. | 704/278 |
| 2005/0060144 A1* | 3/2005 | Koyama | 704/205 |
| 2005/0203750 A1* | 9/2005 | Miyamoto et al. | 704/276 |
| 2008/0294431 A1 | 11/2008 | Miyamoto et al. | |

FOREIGN PATENT DOCUMENTS

| | | |
|---|---|---|
| JP | 2001-092496 A | 4/2001 |
| JP | 2002-162992 | 6/2002 |
| JP | 2003-316384 A | 11/2003 |
| JP | 2004-151614 | 5/2004 |
| JP | 2004-151614 A | 5/2004 |
| JP | 2004-226910 | 8/2004 |
| JP | 2004-302175 | 10/2004 |
| JP | 2005-258198 A | 9/2005 |

OTHER PUBLICATIONS

Lambourne, "Speech-based real-time subtitling service", International Journal of Speech Technology, 2004.*

Imai, Atsushi, et al., "The speech recognition error automatic detection method for real-time news title correction work", NHK R&D, No. 89, pp. 30-39 (Jan. 15, 2005).

* cited by examiner

| CONDITION | SELECT | | |
|---|---|---|---|
| ? | × | ○ | 平成十五年度 |
| ○ | × | ○ | 通信放送 |
| ? | × | ○ | プロジェクトとして行った |
| × | × | ○ | デジタル頭が |
| ? | × | ○ | コンテンツの |
| ○ | × | ○ | アクセシビリティに |
| ○ | × | ○ | ついて発表 |
| ? | × | ○ | いたします。 |
| ○ | × | ○ | |

| | SPEECH RECOGNITION ONLY | CORRECT MATCHING Re | INCORRECT MATCHING Rc | FINAL RECOGNITION RATE BY MATCHING |
|---|---|---|---|---|
| AVERAGE | 81.8% | 3.7% | 7.4% | 78.1% |
| RANGE | 73.4%~89.2% | (N/A) | (N/A) | 70.7%~84.3% |

|  | CONVENTIONAL | PRESENT INVENTION |
|---|---|---|
| AVERAGE | 81.8% | 86.2% |
| RANGE | 73.4%~89.2% | 79.8%~92.3% |
| PROBABILITY OVER 85% | 27% | 82% |
| PROBABILITY OVER 90% | 0% | 27% |

FIG. 10

CORRECTION OF A CAPTION PRODUCED BY SPEECH RECOGNITION

BACKGROUND OF THE INVENTION

The present invention relates to a caption correction device. Particularly, the present invention relates to a device, a method, a program and the like for correcting, in real time, a caption for a speech recognition result of a presentation or the like.

In recent years, provision of captions for information transmitted through speech has been actively encouraged in order to secure accessibility for people with hearing disabilities, seniors and the like. It is also conceivable that there is a substantial need to provide captions for speech in presentations or the like. As conventional methods of providing such captions, the following two typical methods can be cited.

Respeak

A Respeak is a method in which a speaker in the middle respeaks speech made by an actual speaker toward a speech recognition system while listening to the speech. Since the respeaker in the middle is specially trained, he/she can respeak the speech at a high recognition rate even in such a difficult situation.

Stenography

A Stenography is a method in which, generally, a few people take tarns to input contents provided by a speaker while summarizing the contents.

However, it is conceivable that such manual provision of captions is unlikely to spread due to its high cost per unit time. For this reason, many methods have been proposed of creating captions in real time by using a speech recognition technique. For example, Japanese Patent Laid-Open Official Gazette No. Hei 6 (1994)-141240 discloses a technique for creating captions by speech recognition using a method of deciding optimum assumptions in production of TV programs, and the like. Moreover, Japanese Patent Laid-Open Official Gazette No. 2001-092496 discloses a technique for improving a speech recognition rate by 2-pass processing. On the other hand, techniques have been disclosed for supporting operations of checking and correcting speech recognition results, which are manually performed by a checker (judge), without relying solely on the speech recognition (for example, Japanese Patent Laid-Open Official Gazette Nos. 2003-316384, 2004-151614 and 2005-258198).

Generally, in speech recognition, desired recognition rates cannot necessarily be obtained in reality. For example, according to information from a certain demonstration experiment field, a recognition rate of at least 85%, preferably, 90% is required for real-time captions. A recognition rate of 85% may be achieved solely by the speech recognition. However, in reality, the recognition rate is heavily dependent on various conditions. For this reason, it is a reality that a sufficient recognition rate cannot be achieved in many cases.

For example, a result of a certain demonstration experiment shows as follows. The average recognition rate is 81.8% (range: 73.4% to 89.2%.) In addition, a probability that the recognition rate exceeds 85% is 27%, and a probability that the recognition rate exceeds 90% is 0%.

Furthermore, other than the problem associated with the recognition rate, there are also many problematic cases as follows. Words included in speech made by a speaker are erroneously converted into discriminatory expressions, provocative expressions and the like, which are not intended by the speaker, by the speech recognition in the same manner. For example, "JI-TTAI" which means an entity is erroneously converted into "JI-I-TAI" which means own dead body, or the like. Then those expressions are displayed as captions without being corrected, causing a problem.

Moreover, for the speech recognition, handling of proper names is very important. For this reason, many systems have a dictionary registration function. However, there is a case where, when several words are registered, words have the same sound, but are written in different Chinese characters from one another. In this case, it is often hard to judge which one of the words is intended, and incorrect conversion is carried oat. For example, for the name "Yasuko", it is not at all uncommon that a plurality of candidates are registered as different proper names that have the same sound, as is the case with "Brown" and "Browne" that have the same sound but different spells. Similarly, such systems are surely provided with functions for registration and setting of forms such as numerical values as well. However, the registration is performed in a single uniform way. Accordingly, there is no way of judging, word by word, which one of the forms is intended by the speaker in the case of free speech.

The methods as described in Japanese Patent Laid-Open Official Gazette Nos. Hei 6 (1994)-141240 and 2001-092496 depend solely on the speech recognition result, and do not include a method of checking by humans, a method of correcting incorrect recognition or the like. Accordingly, it is conceivable that the methods are less effective in handling the provocative expressions and discriminatory expressions not intended by the speaker.

Moreover, Japanese Patent Laid-Open Official Gazette No. 2003-316384 discloses the following method. Specifically, when speech is made by a speaker, the speech is converted into a text. A checker judges whether or not each word included in the converted text is incorrect. Thereafter, when a word is judged to be incorrect, the judgment is presented to the speaker. Then the speaker is urged to repeat the speech over and over again until the speech is correctly transcribed. However, this method places a burden on the speaker. Furthermore, from the technical perspective, no matter how many times the words not correctly transcribed are repeated, it is not necessarily that those words are correctly transcribed in the end. For this reason, overhead on the speaker increases, and thereby a problem concerning the real-time characteristic also remains.

Furthermore, in the method as described in Japanese Patent Laid-Open Official Gazette No. 2004-151614, it is conceivable that problems still remain of the real-time characteristic and costs since check and correction are all manually performed.

Meanwhile, the method of Japanese Patent Laid-Open Official Gazette No. 2005-258198 discloses a device for setting the timing of displaying predetermined contents of speech in synchronization with reproduction of the speech. However, a method of achieving real-time caption display is not disclosed.

As described above, there are many problems in production and correction of real-time captions. Problems to be solved by the present invention are as follows.

Specifically, the first problem to be solved by the present invention is concerning the real-time characteristic. As the solution of this problem, the present invention provides a caption display system which can display captions generated by converting speech into characters, in real time (in other words, within maximum allowable delay time.) In addition, the second problem to be solved by the present invention is concerning the cost. As the solution of this problem, the present invention provides a caption display system which uses a method less expensive than conventional methods such as the respeak and the stenography. Moreover, the third problem to be solved by the present invention is concerning the speech recognition. As the solution of this problem, in the present invention, keyword matching is performed so as to further improve understanding compared with the case of performing the simple speech recognition. By performing the keyword matching, incorrect conversions of discriminatory and provocative expressions not intended by a speaker and incorrect conversions of proper names and forms, are avoided as much as possible, compared with the case of performing the simple speech recognition.

SUMMARY OF THE INVENTION

An object of the present invention is to solve the above described problems, and thereby to provide inexpensive device, method, program and the like for improving the accuracy of character strings as real-time captions obtained by performing speech recognition on speech such as presentations.

The present invention provides the following device as one embodiment.

Provided is a caption correction device for correcting, in real time, a caption for speech in a presentation. The caption correction device includes a speech recognition unit, a judgment allocation unit, an automatic judgment unit and a manual judgment unit. The speech recognition unit transcribes the speech in the presentation. The speech recognition unit then outputs, as a result of the speech recognition, a text for one or a plurality of character string candidates and confidence factors of the speech recognition, which correspond to the respective character string candidates. The judgment allocation unit selects one of automatic judgment and manual judgment, by use of the confidence factors, job processing information and a predetermined maximum allowable delay time, in order to handle a first character string candidate having the highest value of the confidence factor among the character string candidates. The automatic judgment unit automatically judges whether to set the first character string candidate as a confirmed character string in response to the selection of the automatic judgment by the judgment allocation unit. The manual judgment unit manually judges whether to set the first character string candidate as a confirmed character string in response to the selection of the manual judgment by the judgment allocation unit.

It should be noted that the "presentation" described here is not limited to a presentation by a personal computer or the like using presentation software. The presentation also includes information transmission through speech, such as TV broadcasting.

The caption correction device described above may further include an automatic correction unit and a caption display unit. The automatic correction unit outputs, as a correction result, keywords obtained on the basis of a matching score. Here, the matching score is obtained by comparing a keyword list of the presentation with the character strings which are not confirmed by the manual judgment unit. The caption display unit displays the outputted confirmed character strings and the character strings as the correction result while differentiating the both character strings. The keyword list is dynamically generated from a page unit presentation keyword DB (to be described later).

The job processing information includes a current delay time, the number of unprocessed jobs in the speech recognition unit, and an average job processing time. Here, the job is a minimum unit to be processed by the speech recognition, or a minimum unit for which the confidence factor is determined. Moreover, the average job processing time is obtained by averaging a sum of a processing time per job for the speech recognition unit and a processing time per job for the manual judgment unit (or a processing time per job for the automatic judgment unit).

Furthermore, the judgment allocation unit in the caption correction device of the present invention allocates the jobs to the automatic judgment and the manual judgment in accordance with the degree of difference between the confidence factor and the average of the confidence factors.

Moreover, as described later, the manual judgment, unit in the caption correction device of the present invention may include at least one of a speech speed conversion means, a silent portion removal means, a margin-provided emphasis reproduction means, an automatic reminder means by repetitive reproduction, and an automatic stop means. The caption correction device may also include the manual judgment units as many as the number of checkers (judges) who perform the manual judgment.

The automatic correction unit in the caption correction device of the present invention corrects the character string to the keyword when the matching score is equal to or more than a predetermined reference value. The automatic correction unit then outputs the character string as an unconfirmed character string. When the matching score is less than the predetermined reference value, the automatic correction unit outputs a second character string candidate as the unconfirmed character string. In a case where the second candidate is judged to be not suitable as a correction result on the basis of predetermined conditions, the automatic correction unit judges the remaining candidates one by one as to whether or not the candidate is suitable as a correction result. In this event, in the judgment based on the conditions, when the second candidate or the remaining candidates is a predetermined discriminatory expression or a provocative expression (usually obtained from a database), the candidate is judged to be not suitable as the correction result.

Moreover, the caption display unit in the caption correction device of the present invention can display the confirmed character strings and the corrected character strings by changing font attributes (italic, emphasis, color, underline and the like) thereof. In addition, the caption display unit can display the corrected character strings by adding other letter types (for example, letter types converted into Roman characters, hiragana characters and the like in the case of Japanese) thereto.

Characteristics of the device of the present invention will be described. First, the device obtains one or a plurality of texts and information on confidence factors (reliability) outputted by speech recognition as a speech recognition result. Next, on the basis of this information, the device judges a current processing situation so as to complete all processing within a maximum allowable delay time as previously specified so as not to lose its real-time characteristic. Concurrently, the device performs a dynamic check automatically or manually on a first candidate text. Moreover, a character string judged to be incorrect by the manual check is automatically corrected, by use of a text of a second candidate or a candidate subsequent thereto, or by use of keywords in backup information of a presentation. In this manner, only the character string judged to be incorrect in the manual check by the checker is automatically corrected. Accordingly, compared with a method of unconditionally performing only automatic correction, efficiency of the automatic correction is significantly improved. Furthermore, the system of the present invention does not rely on the speech recognition engine. On the contrary, the system can utilize characteristics of the speech recognition engine, by optimizing the maximum allowable delay time, the number of processable jobs and the like.

The present invention has been described above as a single device that is a typical form. However, the present invention can also be regarded as a plurality of devices including the same functions, a computer system having computers combined, or a processing method in the computer system. The present invention will be specifically described on the basis of an embodiment to be described later.

Moreover, the present invention can also provide a program including the functions of the device of the present invention, or a program product including a computer-readable recording medium in which the program is stored. The program may be provided by the recording medium as well as by being downloaded into a computer via a network.

BRIEF DESCRIPTION OF THE DRAWINGS

For a more complete understanding of the present invention and the advantage thereof, reference is now made to the following description taken in conjunction with the accompanying drawing.

DETAILED DESCRIPTION OF THE PREFERRED EMBODIMENT

With reference to the drawings, the present invention will be described in detail below according to an embodiment.

Figure 1:
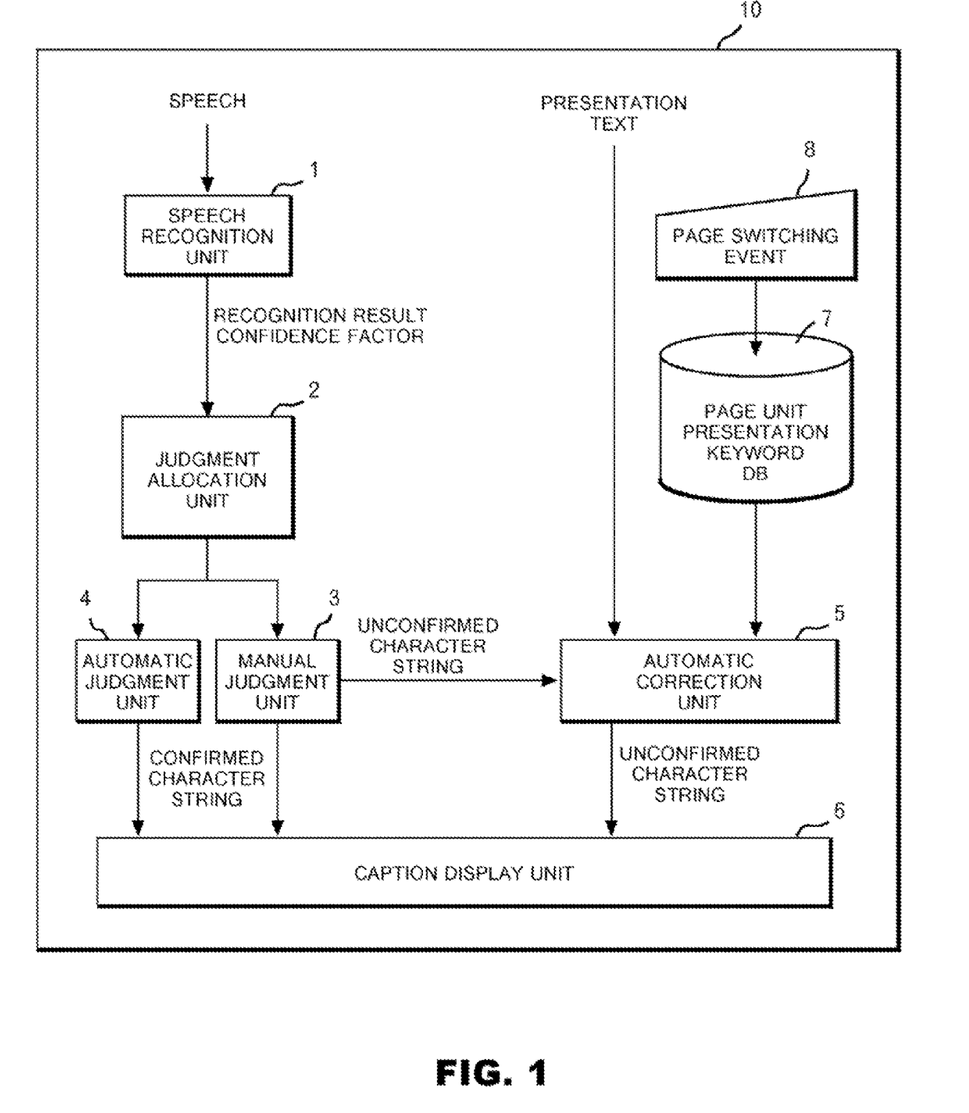
FIG. 1 is a view schematically showing a caption correction device 10 according to a preferred embodiment of the present invention.

FIG. 1 schematically shows a caption correction device 10 as a preferred embodiment of the present invention. The caption correction device 10 includes a speech recognition unit 1, a judgment allocation unit 2, a manual judgment unit 3, an automatic judgment unit 4, an automatic correction unit 5 and a caption display unit 6. However, the device is not limited to the configuration described above but may have other configurations as long as the same functions are achieved or may include a sub-combination thereof.

The speech recognition unit 1 converts a speech of a speaker into a text. In this event, a confidence factor (also called a degree of reliability or a recognition score) for the converted text is outputted. The converted text is not limited to one, and a second candidate, a third candidate and candidates subsequent thereto are outputted together with confidence factors corresponding to the respective candidates. As to the speech recognition itself, a heretofore known technique may be used.

The judgment allocation unit 2 automatically determines, in real time, whether to use automatic judgment means or manual judgment means. The judgment is based on the confidence factor of speech recognition, a maximum allowable delay time, a current delay time (processing time), the number of unprocessed jobs, and average job processing time. The confidence factor of speech recognition is obtained from the speech recognition unit 1, and the maximum allowable delay time is defined in advance, within which jobs are transcribed as being processed in "real time." Specifically, in a case where the number of unprocessed jobs is small and the difference between the delay time and the maximum allowable delay time is still greatly different from the maximum allowable delay time, automatic judgment is selected when the confidence factor of a character string to be judged is greatly different from an average. This is because the reliability of the speech recognition result is considered to be high when the confidence factor is greatly different from the average. Furthermore, for the judgment allocation unit 2, the average job processing time and the number of unprocessed jobs are taken into consideration. Thereby, a degree of allocation to the automatic judgment can be dynamically changed, as the delay time approaches the maximum allowable delay time.

Figure 2:
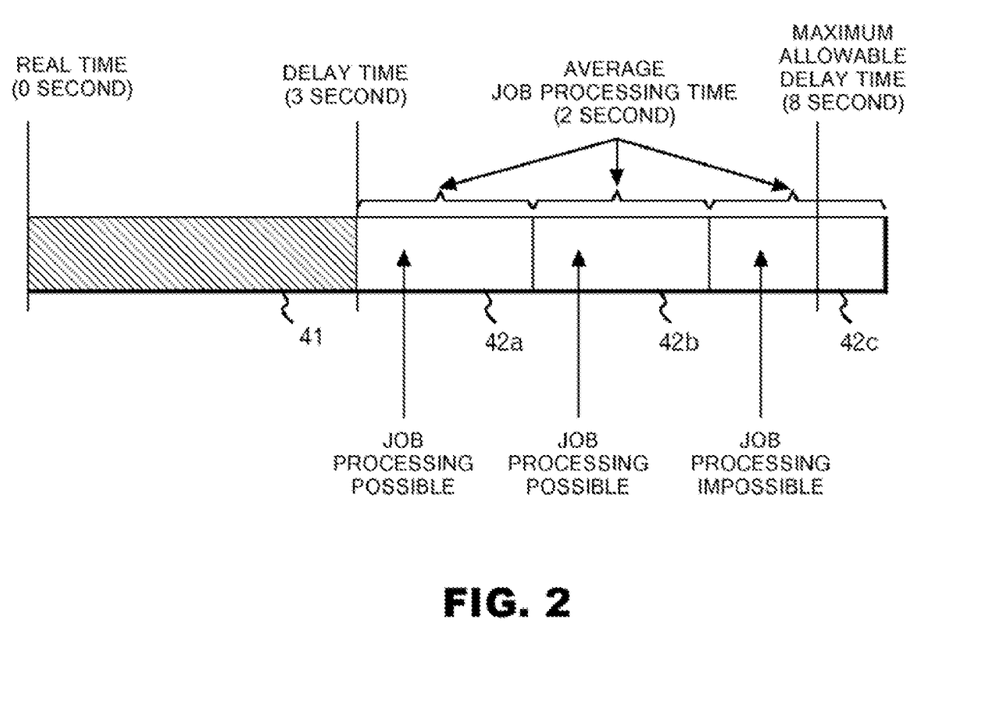
FIG. 2 is a view showing a concept of judgment of allocation by a judgment allocation unit 2.
Figure 4:
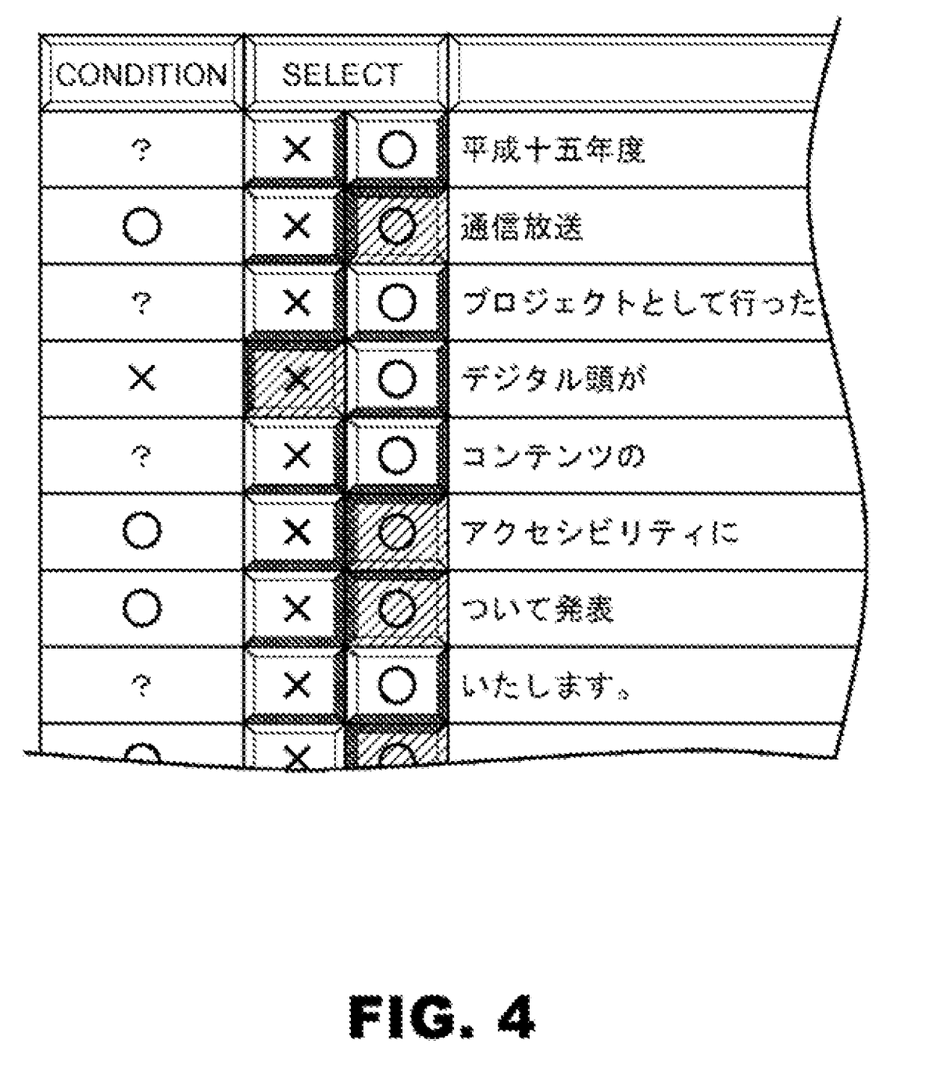
FIG. 4 is a screen example showing manual judgment of jobs as a speech recognition result.

FIG. 2 shows a concept of determination of the allocation. In the example of FIG. 2, the maximum allowable delay time is set at 8 seconds. Assuming that the current delay time 41 is 3 seconds and the average job processing time (42a to 42c) is 2 seconds, the number of remaining jobs that can be processed is 2. Here, the job may be considered to be a unit processed by the speech recognition unit 1 or a unit for which the confidence factor is determined. For example, in an example of a judgment screen for a speech recognition result as shown in FIG. 4 to be described later, each row corresponds to one job.

In the example of FIG. 2, assuming that the number of unprocessed jobs is 2 or less, there is still room until the delay time reaches the maximum allowable delay time, taken the average job processing time (42a and 42b) into consideration. In this case, the judgment allocation unit 2 determines that high reliability can be obtained by the automatic judgment when the difference between a confidence factor of a character string obtained as a result of speech recognition and the average is greatly large. In other words, the determination depends on whether the confidence factor is larger or smaller than a predetermined threshold. On the other hand, when the average job processing time is longer or the number of unprocessed jobs is larger, the judgment allocation unit 2 determines that it is better to allocate the check to the manual judgment, on the basis of the confidence factor.

Here, conditions for the manual judgment may be defined as the following expression 1. However, the conditional expression for determining whether to allocate a job to the manual judgment or to the automatic judgment is not limited to the following. In example 3, another conditional expression is described.

Probability Density $g(x)$ of Confidence Factor $x$ for Given $\leq$ Job     Expression 1

$$\frac{1}{\text{Number of Processable Jobs for Achieving Real-time Processing (Finishing Processing Within Maximum Allowable Delay Time)}}$$

Figure 3:
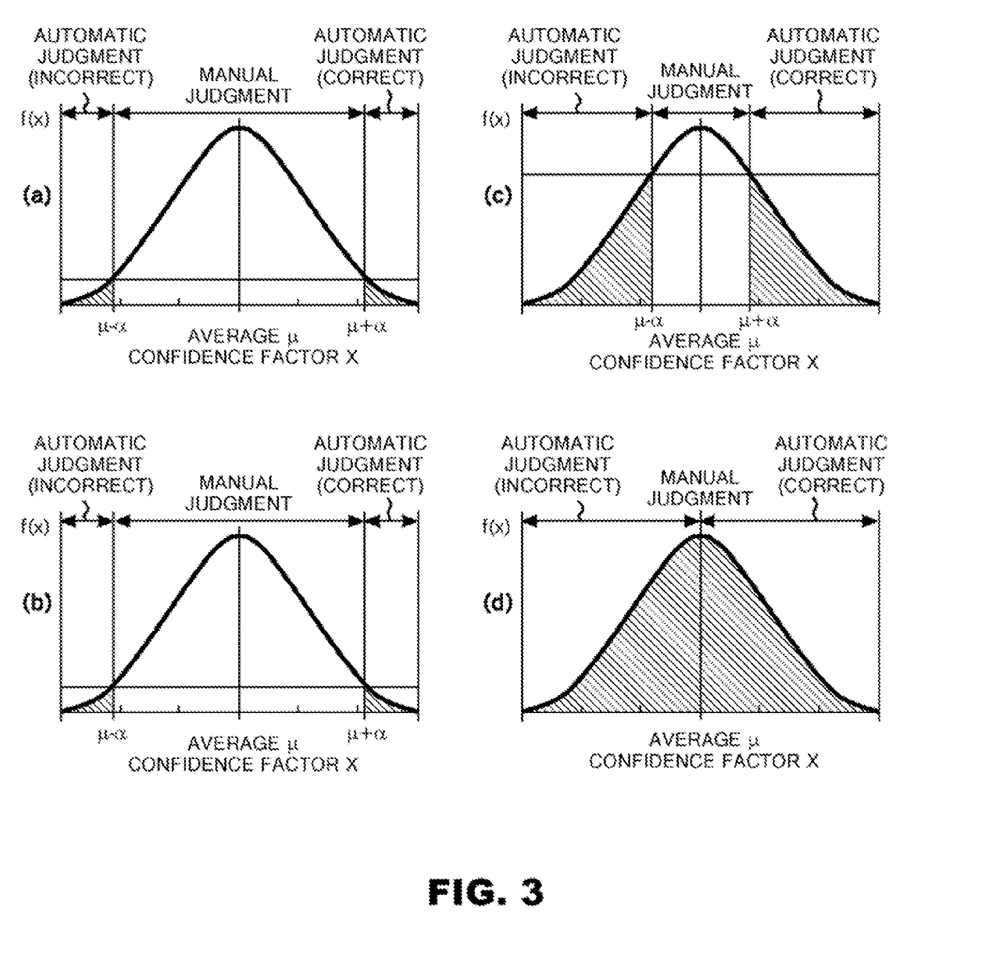
FIGS. 3A to 3D are graphs showing a concept of a threshold used for allocation of automatic judgment and manual judgment by the judgment allocation unit 2.

Each of FIGS. 3A to 3D conceptually shows a threshold $\alpha$ used in the determination described above. Here, as shown in each of FIGS. 3A to 3D, the distribution of confidence factor X complies with a certain probability density function (here, a normal distribution function). In each of FIGS. 3A to 3C, regions where the automatic judgment is chosen due to the confidence factor X different from the average $\mu$ by $\alpha$ or more are indicated by slant lines. However, as to the automatic judgment, there are cases of correct judgment and incorrect judgment. Assuming that $\alpha$ is set at 0, everything is processed by the automatic judgment as shown in FIG. 3D.

Here, the description will be given with reference to FIG. 1, again. Both of the manual judgment unit 3 and the automatic judgment unit 4 can also be regarded as a hybrid check device together, which includes both automatic and manual check functions as described above. In the case of manual check, for the purpose of supporting operations by a checker (a judge), the hybrid check device includes functions such as speech speed conversion, removal of silent portions, margin-provided emphasis reproduction, automatic reminder by repetitive reproduction and automatic stop. FIG. 4 shows an example of a screen with which the manual check is performed. Here, FIG. 4 shows processing of confirming the result obtained by the speech recognition. The checker confirms the result by pressing selection buttons "confirmed." When the checker cannot confirm (when the result is judged to be incorrect) the result, the checker presses selection buttons "incorrect" and the result is passed, as unconfirmed characters, to the automatic correction unit 5 for processing.

Here, the speech speed conversion will be described. It is generally said that a speaking speed is faster than a reading speed. For this reason, it is generally required to adjust a speech speed in order to compare caption candidates with speech by reading the caption candidates. There are a method of directly changing a pitch according to a selected speed, a method of changing only a speed without changing a pitch, and the like. The removal of silent portions is a measure for reducing time for the check, when the speaker makes no sound, by automatically removing the silent portion.

Figure 5:
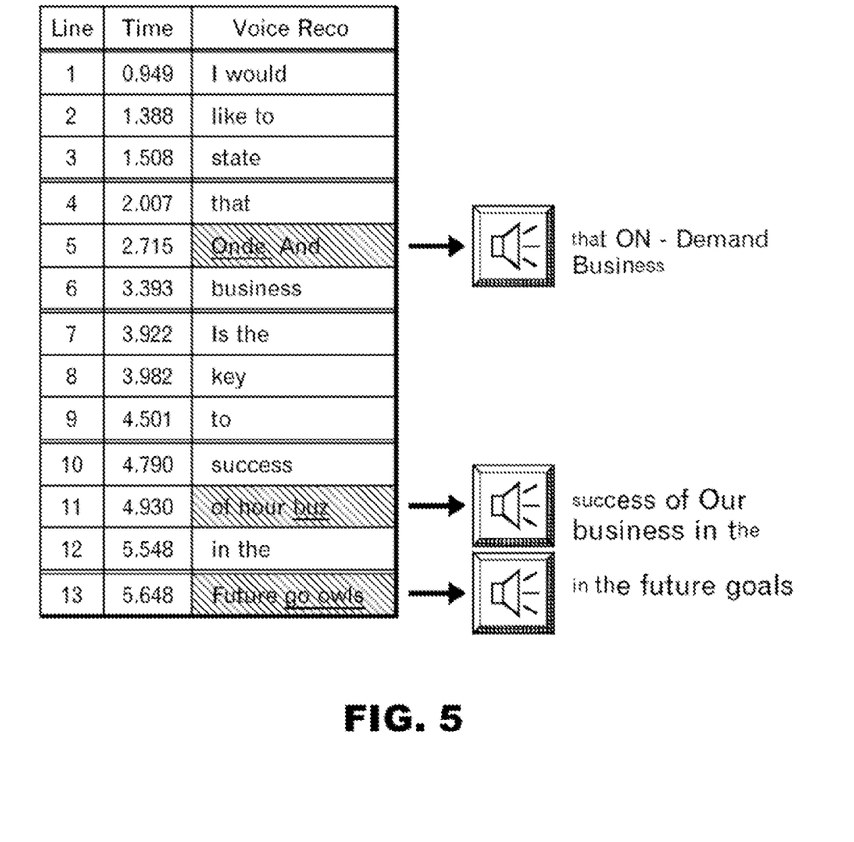
FIG. 5 is an image diagram of margin-provided emphasis reproduction.

Moreover, the margin-provided, emphasis reproduction means reproducing a preceding line "fade-in" reproduction of a preceding line (or a preceding word) and "fade-out" reproduction of a subsequent line (or a subsequent word). The margin-provided emphasis reproduction means that a preceding line (or a preceding word) is reproduced in a fade-in manner, and a subsequent line (or a subsequent word) is reproduced in a fade-out manner. FIG. 5 is an image diagram of the emphasis reproduction. Here, characters that "fade in" are indicated in a manner that the characters gradually get larger word by word, and characters that "fade out" are indicated in a manner the characters gradually get smaller word by word. In such a manner, it is possible to support the manual check of words.

Moreover, the automatic reminder by repetitive reproduction means reminding the checker to input by reproducing repetitive sounds. Furthermore, the automatic stop means stopping the reminder when the checker uses a mouse, a keyboard or the like to input.

Note that the caption correction device 10 can include the manual check function of the manual judgment unit 3 as many as the number of checkers. This will be described later.

The automatic correction unit 5 shown in FIG. 1 performs automatic correction by matching a keyword list dynamically generated from a backup material of a presentation with character strings judged to be incorrect. The backup material includes, for example, a presentation page, a speaker note and a supplementary text material such as a script.

In the automatic correction unit 5, when a result of matching does not exceed a threshold for any of keywords from the keyword list, a correction result is obtained from a second candidate obtained from the speech recognition. The candidates after the second candidate are character strings each having a confidence factor lower than that of the first candidate among the character strings transcribed by the speech recognition unit 1. For the matching, DP matching (Dynamic Programming Hatching) is used, which is a common method of comparing character strings. Furthermore, when there is no match at the character string level, matching is also performed at a phonemic level.

Figure 6:
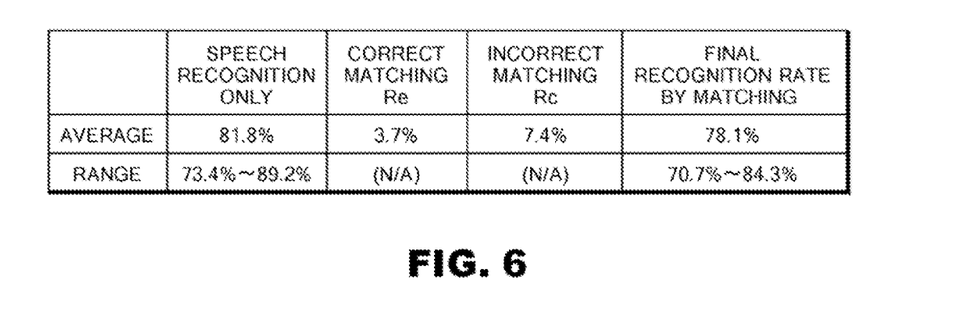
FIG. 6 is a table showing an experimental example of a recognition rate in simple matching.

Here, in simple matching, it should be noted that, in many cases, a recognition rate is adversely lowered by the matching. Specifically, a rate at which recognition is improved by correcting incorrect portions is set to be Re, and a probability of adversely lowering the recognition rate by accidentally correcting correct portions is set to be Rc. Here, a result of comparison between Re and Rc is not necessarily Re>Rc. FIG. 6 shows one piece of actual experimental data of the simple matching for reference. In the matching method of the present invention, the matching is performed after the check is performed by the automatic judgment or the manual judgment, in advance. Accordingly, the risk of adversely lowering the recognition rate is small.

Here, the description will be given with reference to FIG. 1, again. In the automatic correction unit 5, when no proper correction result can be obtained by the provision of the second candidate obtained from the speech recognition with given conditions, a correction result is obtained by use of the third candidate and those subsequent thereto. When none of the candidates can foe a proper correction result, the original first candidate is outputted as it is without being corrected.

Generally, in a presentation using a presentation application, a plurality of presentation pages are used for a slide show. For this reason, it is possible to create a keyword list from character strings included in each of the presentation pages actually presented by a presenter of the presentation. What stores keywords included in each of the presentation pages is called a page unit presentation keyword DB, which is indicated as a page unit presentation keyword DB 7 in FIG. 1. For example, when a page switching event 8 occurs in response to an operation by the presenter using the mouse or the keyboard, the switching of pages can be transcribed. Here, presentation keywords are a list of keywords such as words and paragraphs, which are obtained from presentation pages, speaker notes and supplementary texts such as scripts. Basically, for the list of keywords, TF•IDF (Term Frequency•Inverse Document Frequency) is used. The TF•IDF is a method which uses a morphological analysis and weighting by use of element attributes in the presentation. Since the TF•IDF is a heretofore known method, description thereof will be omitted here. The provision of the page unit presentation keyword DB 7 allows the automatic correction unit 5 to use the DB for the post-editing of captions, and thus to display the captions in real time by automatic matching with the keywords.

Lastly, the caption display unit 6 automatically merges the character strings (confirmed character strings and unconfirmed character strings) obtained from the automatic judgment unit 4, the manual judgment unit 3 and the automatic correction unit 5. In addition, the caption display unit 6 uses various display styles in terms of font attributes and the like, depending on whether the character strings are correct or incorrect. Here, the caption display unit 6 expresses the character strings judged to be incorrect by using other character types such as phonemes, hiragana characters, in addition to a normal character type.

Figure 7:
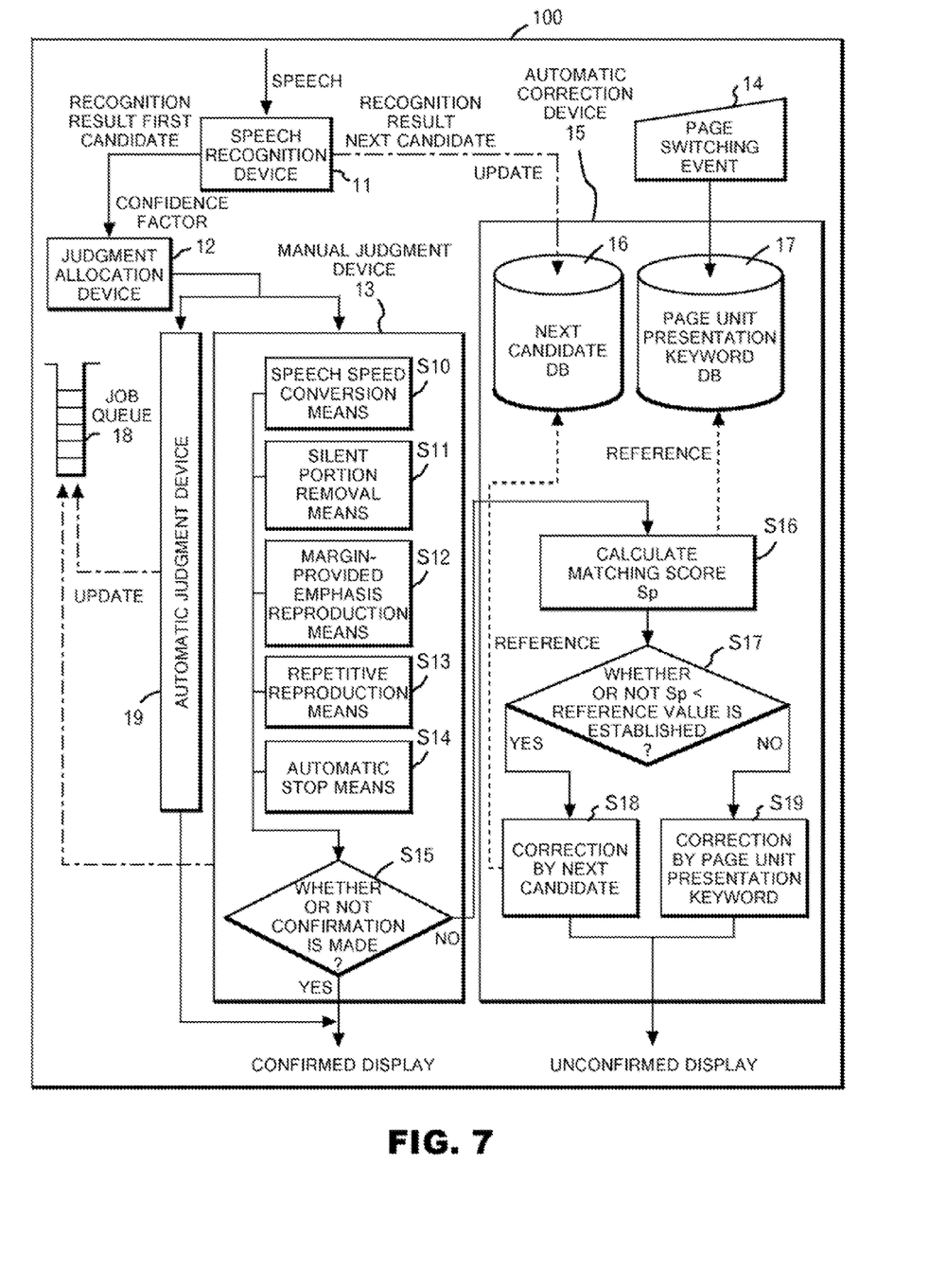
FIG. 7 is a view schematically showing a caption correction system 100 in a case where there is one checker according to the embodiment of the present invention.

In the embodiment shown in FIG. 1, the caption correction device 10 according to the present invention has been described above as a single device. However, the caption correction device 10 may have a system configuration in which each of the functions is regarded as one separate device. FIG. 7 shows this system configuration of a case where there is one checker. Here, FIG. 7 shows devices and internal processings thereof, which devices correspond to the respective functional units shown in FIG. 1.

The following is a flow of processing by a caption correction system 100 shown in FIG. 7. However, since configurations of the respective devices approximately correspond to those in the device shown in FIG. 1, redundant descriptions will be omitted.

1) A recognition result character string is obtained by speech recognition device 11. Here, not only the recognition result character string but also a confidence factor corresponding to the recognition result character string. In addition, character strings each having a confidence factor lower than that of the recognition result character string are obtained as next candidates (the second candidate, the third candidate or the like) for the recognition result character string. The character strings of the respective next candidates may be stored in a next candidate DB 16 as shown in FIG. 7.

2) The recognition result character string is allocated to either manual judgment or automatic judgment by a judgment allocation device 12 (Step S10). The manual judgment provides a confidence factor to be obtained as a result higher than that provided by the automatic judgment. For this reason, when there is sufficient spare time, the manual judgment is selected. Meanwhile, when the confidence factor obtained from the speech recognition is greatly different from an average (for example, 50%), there is a high possibility that the recognition result character string is automatically judged (for example, the character string is judged to be correct when the confidence factor is 95% and the character string is judged to be incorrect when the confidence factor is 5%). Accordingly, in order to achieve real-time captions, the judgment is dynamically allocated to the automatic judgment in accordance with the degree of difference between the confidence factor obtained by the speech and the average of the confidence factors, in a situation where there is a delay in consideration of job situations, maximum delay time and actual elapsed time. An example of the judgment allocation device 12 will be described later as example 3.

3) In the case of the manual judgment, speech is automatically reproduced by speech speed conversion (Step 811), removal of unnecessary silent portions (Step S12), and a speech reproduction method (margin-provided emphasis reproduction, automatic reminder by repetitive reproduction and automatic stop). Then the checker is allowed to perform the manual judgment by using a method described in example 4 for comparing the reproduced speech with the speech recognition result (Step 13). A UI (User Interface) for the judgment by the checker will be described in example 2 to be described later. In a case where the automatic judgment is selected in the judgment step of S10, the automatic judgment (Step S14) is directly executed. Moreover, in a step S15 of judging confirmation, a job queue 18 managed by the judgment allocation device 12 is updated.

4) For the character string that is not confirmed (NO in the judgment step S15), matching the character string with the page unit presentation keyword DB 17 is performed by use of the matching method described above. In a step S17, a score Sp (Score Point) according to the matching is calculated (Step S16). When the Sp is equal to or more than a predetermined reference value, a character string obtained by correcting the character string is set to be an unconfirmed character string (Step S19). On the other hand, when the Sp is lower than the reference value, a character string obtained by correcting the second candidate is outputted as an unconfirmed character string (Step 518).

5) In a case where the second candidate is judged to be not suitable as a correction result according to previously given conditions, such as discriminatory expressions, the third candidate is sequentially obtained from the next candidate DB 16. Accordingly, correction is performed by use of the obtained candidate.

6) If none of the candidates obtained by the speech recognition device 11 can be a correction result, the first candidate is outputted as it is without being corrected.

7) As to the confirmed character string and the unconfirmed character string (subjected to matching), the font attributes thereof are changed so as to clearly differentiate the two strings. This will be described later as example 1.

Figure 8:
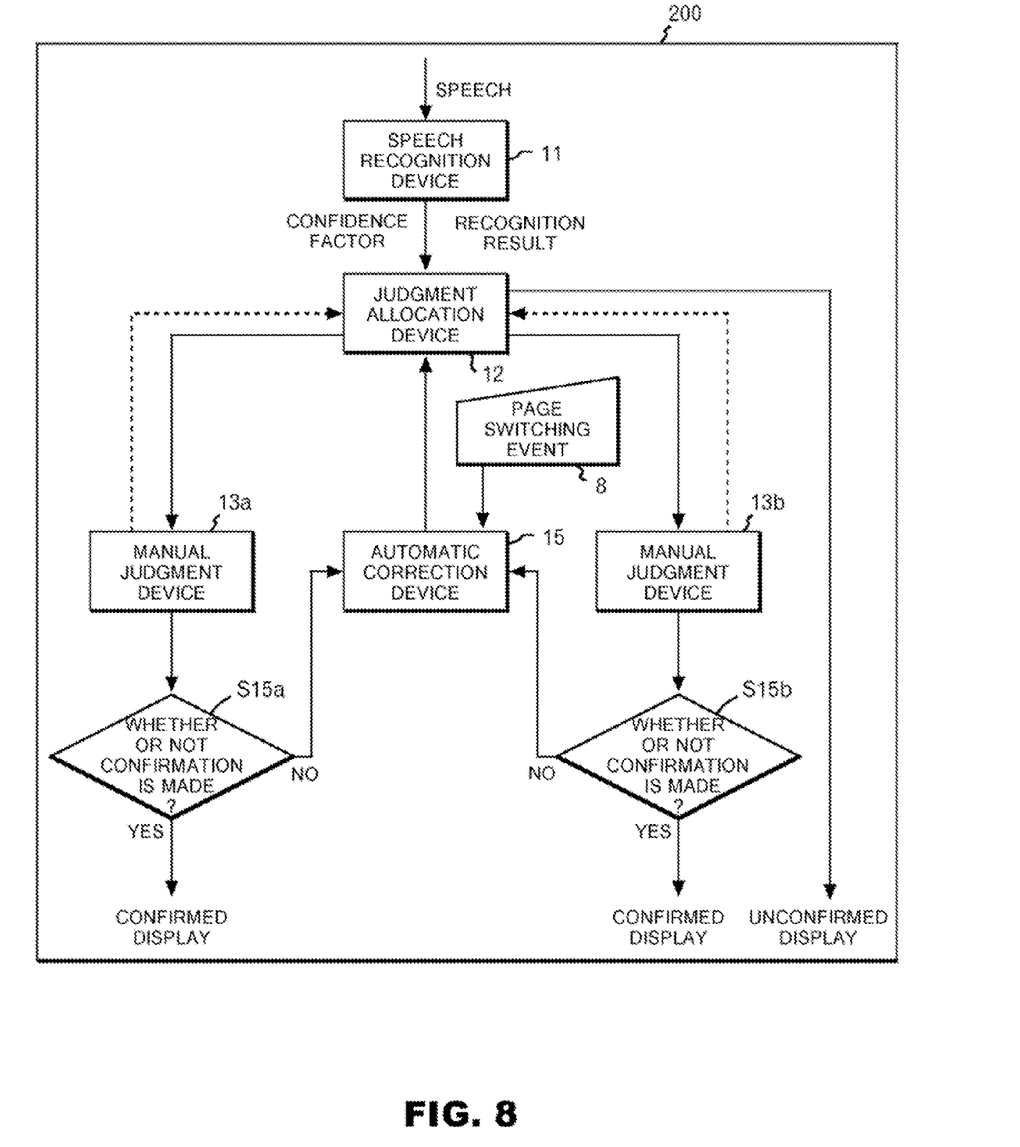
FIG. 8 is a view schematically showing a caption correction system 200 in a case where there are two checkers according to the embodiment of the present invention.

Normally only one checker is sufficient as described above. However, the system of the present invention is also applicable to the case where there are two checkers or more. In such a case, by providing manual judgment devices 13 for the number of checkers, the recognition rate and caption display are further improved. FIG. 8 shows a caption correction system 200 in the case where there are two checkers.

Characteristics of the case where there are a plurality of checkers are as follows.

1) The same number of manual judgment devices 13a and 13b as that of checkers are provided.

2) A judgment allocation device 12 allocates a job to available one of the manual judgment devices 13a and 13b.

3) Character strings which are not confirmed by the manual judgment devices 13a and 13b are corrected once by an automatic correction device 15. Thereafter, the character strings are returned to the judgment allocation device 12. When any one of the manual judgment devices 13a and 13b are available, the judgment allocation device 12 allocates jobs to be manually judged thereto the manual judgment device 13a or 13b. On the other hand, when the manual judgment devices 13a and 13b are not available, unconfirmed display is directly performed.

4) There is no point in executing matching twice by the automatic correction device 15 for the same character string in such a manner in which the character string is passed to the automatic correction device 15 from the manual judgment device 13a or 13b, returned to the manual judgment device 13a or 13b, and again passed to the automatic correction device 15. Specifically, in such a case, the same keyword and the second candidate which are used in the first matching by the automatic correction device 15 are not used twice. Accordingly, matching is performed by use of keywords other than the keyword used in the first time or the third candidate other than the second candidate.

Example 1

Method for Displaying Confirmed and Unconfirmed Character Strings

Figure 9:
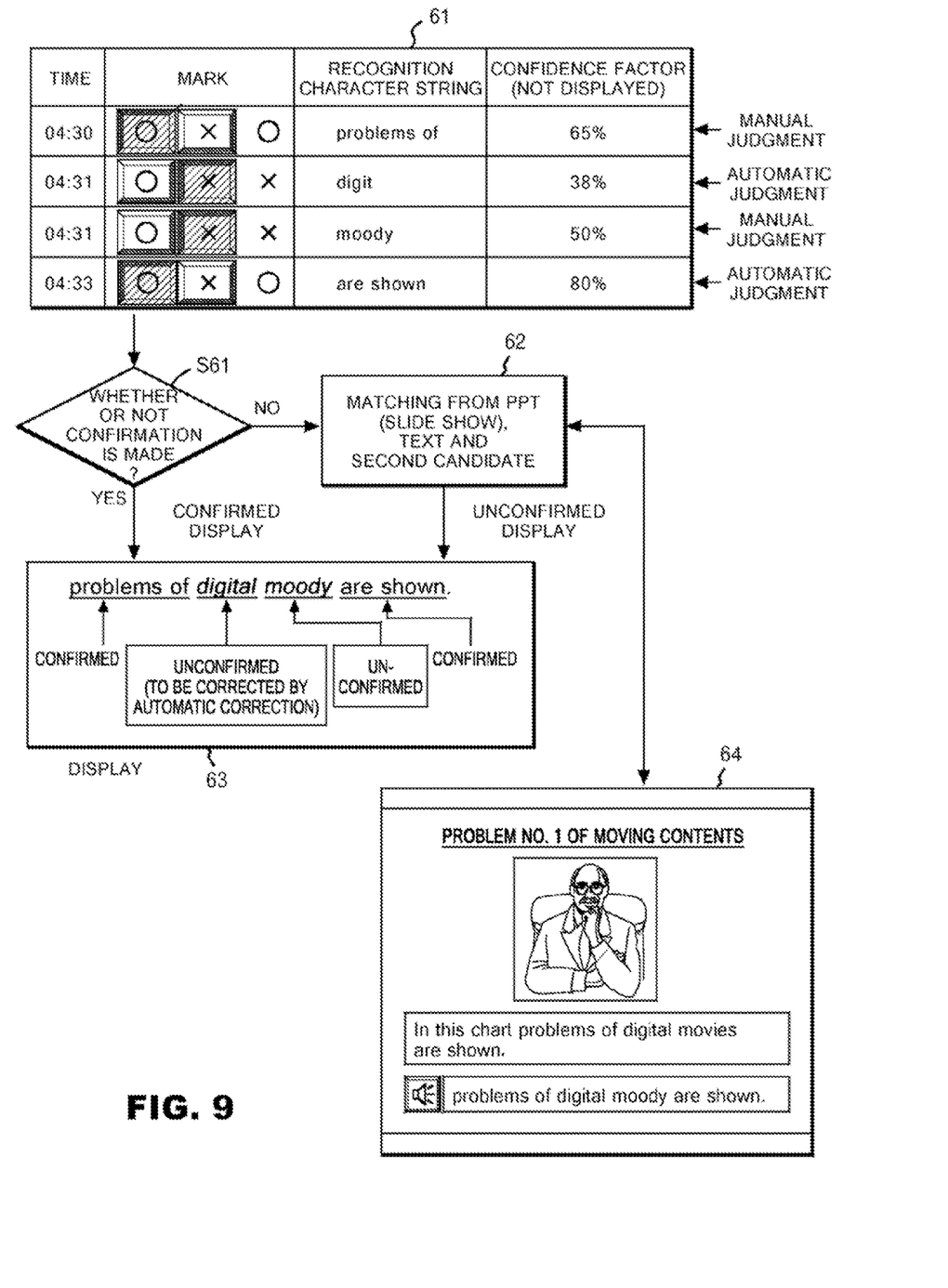
FIG. 9 is a view showing an example of a screen in execution of an application of the present invention.

FIG. 9 shows an example of the present invention. In FIG. 9, an image of a speaker (presenter) is displayed on a window screen denoted by reference numeral 64. The screen 64 shows a result of recognition of speech made by the speaker. Additionally, a window screen 60 snows results each obtained by manual or automatic check performed by the manual judgment device 13 on recognition character strings which is obtained by the speech recognition. However, confidence factors of the speech recognition may be hidden. In order to display whether the check by the manual judgment device 13 is confirmed or not confirmed, a checker performs confirmation judgment as indicated by S61. The character string judged to be incorrect is set to be an unconfirmed character string and is subjected to matching in a step 62 (the automatic correction device 15). As a result of the matching, the corrected character strings are displayed on a window 63 while being classified into confirmed character strings and unconfirmed character strings. Here, FIG. 9 shows an example of a display method of a case where the confirmed character strings are displayed in black and the unconfirmed character strings are displayed in italic (it is actually much better to display in other colors). As can be seen from FIG. 9, even the unconfirmed display may be correctly displayed by use of, for example, a PPT file or presentation backup materials of other texts. Moreover, the confirmed character strings can be confirmed by the automatic judgment as well as by the manual judgment. Accordingly, character strings confirmed respectively by both judgments can also be displayed while being differentiated from each other by use of different font attributes.

Example 2

Manual Operation in Manual Judgment Device 13

An example of a UI (User Interface) for a manual operation by a user in the manual judgment device 13 will be described here.

1) A key operation (or a mouse click and the like) is performed in any event. For example, Enter key is pressed when a target character string is correct and Space key is pressed when the target character string is incorrect.

2) Selection is carried out as in the case of 1), but a time-out period is provided. When none of the keys is pressed within the period, default is forcibly selected. Since the recognition result is usually correct in many cases, improvement in performance can be expected by setting the default to be correct.

Example 3

Judgment Allocation Device 12

Conditions of the automatic judgment are set as follows. The more the confidence factor is different from the average, the more likely the automatic judgment is to be carried out in consideration of allowable delay time, average job time and elapsed time. In addition, as the allowable delay time is running out, the confidence factor close to the average is also more likely to be allocated to the automatic judgment.

Description will be given in detail of a calculation method in the case where a normal distribution is assumed for a confidence factor Ci. A probability density function f(x) of the normal distribution where an average and a variance are represented respectively by μ and σ, is given by the following expression, $$f(x) = \frac{1}{\sigma\sqrt{2\pi}} e^{-\frac{(x-\mu)^2}{2\sigma^2}}$$  Expression 2

Based on the expression described above, a probability that a random variable X becomes equal to or less than α is given by the following expression, $$P(X \leq a) = \int_{-\infty}^{a} f(x)dx$$  Expression 3

Generally, this integral calculation is not easy. However, by using a linear relationship of the probability density function and given values, it is possible to determine which is to be required the automatic judgment or the manual judgment. The automatic judgment is required when the following conditional expression is satisfied assuming that the allowable delay time is Twmax, the average job processing time is Tave and the process time is Ti. On the other hand, the manual judgment is required when the conditional expression is not satisfied. In the case of the automatic judgment, it is possible to judge that the confidence factor not more than the average μ leads to unconfirmed display and that the confidence factor larger than the average μ leads to confirmed display.

|μ−Ci|≧|norm sin v(1/Nj)|  Expression 4

Note that "normsin v" represents an inverse function of a standard normal cumulative distribution. Here, since Nj is the number of remaining jobs, Nj is set at a value rounded to the nearest natural number without exceeding Ni given by the following expression.

Ni=(Twmax−Ti)/Tave  Expression 5

Note that the above values can be obtained in the same manner even when there are multiple manual judgment devices.

Example 4

Method of Comparing Speech Recognition Result with Speech

As a common method of a checker to compare a speech recognition result with speech, the checker usually compares character strings with the speech by reading the character strings while listening to the speech. However, for example, it is also possible for visually impaired people or the like to compare character strings with input speech while simultaneously reproducing the character strings by speech synthesis.

Example 5

Checker Using No Sound

The method of comparing the speech recognition result with the input speech has been described as the means of the present invention. However, in many cases, the speech recognition result includes significant errors. For this reason, even though there is no input speech, simple check can be executed. Specifically, people with hearing difficulties or the like can also surely perform the check.

Example 6

Operational Effects

As operational effects of the present invention, reduction in costs, improvement in a recognition rate, improvement in understanding and a real-time characteristic will be summarized as below.

Cost Reduction Effects

First, by use of the method of the present invention, significant cost reduction can be expected compared with manual caption correction. Note that, as to delay time from the actual time, no significant difference is found between the respeak, the stenography and the embodiment of the present invention.

Recognition Rate Improvement Effects

Figure 10:
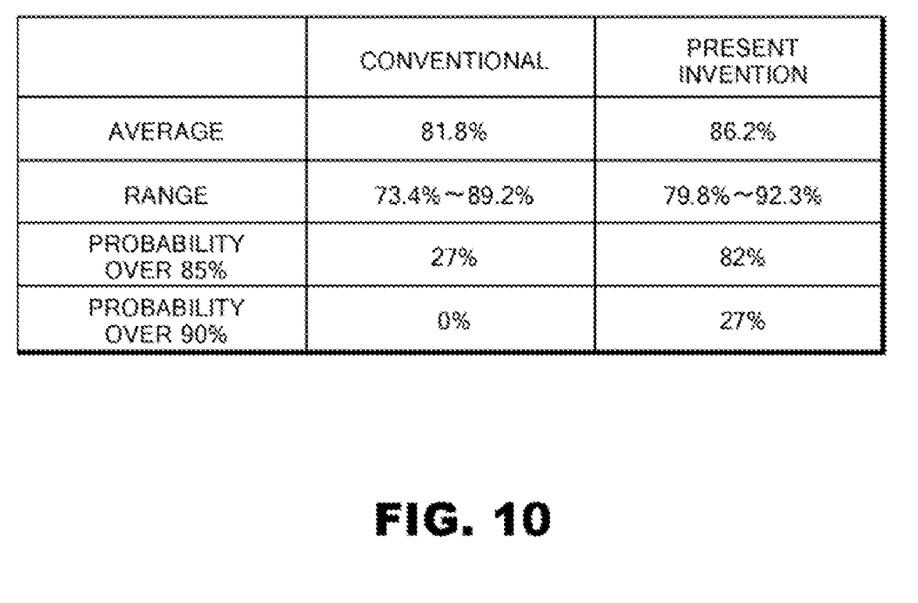
FIG. 10 is a view showing an effect of improvement in a speech recognition rate in an example of the present invention.

FIG. 10 shows a result of a matching experiment based on the result of the demonstration experiment at a certain university introduced in BACKGROUND OF THE INVENTION. Although already described above, it is generally said that the real-time captions require the recognition rate of 85% or more, preferably, 90% or more. A probability that the recognition rate exceeds 85% is improved from 27% to 82%, and a probability that the recognition rate exceeds 90% is improved from 0% to 27%

Other Effects

Although quantification is difficult, particularly significant improvement in the recognition rate is found for important keywords. For this reason, the improvement in the recognition rate significantly contributes to improvement in understanding compared with the simple speech recognition itself. Moreover, as to discriminatory expressions not intended by the speaker and formatting, significant improvement is achieved by matching with the page unit presentation keywords.

The present invention has been described above as the caption device that is one embodiment or the system. However, the device or the system of the present invention can be realised as hardware, software or a combination of hardware and software. As implementation by the combination of hardware and software, implementation in a computer system having a predetermined program is cited as a typical example. In such a case, when the predetermined program is loaded into the computer system and executed, the program allows the computer system to execute the processing according to the present invention. This program includes a group of commands that can be expressed by any language, code or notation. Such a group of commands enables the system to directly execute specific functions or to execute the functions after any one of or both of (1) conversion into another language, code or notation and (2) copying onto another medium are performed. Needless to say, the scope of the present invention includes not only such a program itself but also a program product including a medium in which the program is stored. The program for executing the functions of the present invention can be stored in arbitrary computer-readable media such as a flexible disk, a MO, a CD-ROM, a DVD, a hard disk device, a ROM, an MRAM and a RAM. The program described above can be downloaded from another computer system connected through a communications line or can be copied from another medium in order to be stored in the computer-readable medium. Moreover, the program can also be stored in a single or a plurality of recording media by compression or division into several pieces.

Note that the computer or the computer system used in the present specification refers to not only a general personal computer or a general-purpose computer but also various devices equipped with a microprocessor (a CPU or a MPU).

According to the present invention, in a caption correction system using speech recognition, it is possible to improve a recognition rate, to improve a real-time characteristic, and to achieve significant cost reduction compared with manual caption production.

Although the present invention has been described above based on the embodiment and the examples, the technical scope of the present invention is not limited to those described in the embodiment and the like Various changes or modifications can be added to the foregoing embodiment. Moreover, it is apparent from description of the scope of claims that embodiments having such changes or modifications added can also be included in the technical scope of the present invention.

What is claimed is:

1. A method of correcting character strings for a unit of speech in a presentation in real time and for displaying as a caption, the method comprising steps of:
   recognizing the unit of speech in the presentation, and then outputting, as a result of the speech recognition, one or a plurality of texts of character string candidates and confidence factors of the speech recognition which correspond to the respective character string candidates;
   selecting between automatic judgment and manual judgment for the unit of speech, the selecting comprising:
      selecting automatic judgment when a total of a current processing time for the unit of speech and an average time to process unprocessed jobs is less than a predetermined maximum allowable delay time and when the confidence factor of a first character string candidate is greater than a predetermined threshold value, wherein a job is a minimum unit processed by speech recognition for which a confidence factor is determined, and wherein the first character string candidate has the highest confidence factor of the character string candidates for the unit of speech; and
      selecting manual judgment otherwise;
   in response to selecting automatic judgment, automatically judging whether to confirm the first character string candidate as a confirmed character string;
   in response to selecting manual judgment, outputting the speech and the character string candidates to a checker and determining whether to confirm a character string out of the character string candidates as a confirmed character string based on an instruction accepted from the checker; and
   displaying the confirmed character string as the caption.

2. The method according to claim 1, further comprising:
   performing automatic correction comprising, when a character string was not confirmed based on the instruction accepted in the manual judgment step, confirming a keyword with the highest matching score of matching scores obtained by comparing a keyword list of the presentation with the character string candidate, and outputting the keyword as a correction result; and
   caption display of displaying by discriminating between a confirmed character string confirmed based on the instruction accepted in the manual judgment step and a character string of the correction result confirmed by the automatic correction.

3. The method according claim 1, wherein:
in the selecting step, the predetermined threshold value used to perform the selection of the automatic judgment or the manual judgment is based on the degree of difference between the confidence factor of the first character string candidate and the average of confidence factors for jobs processed by speech recognition.

* * * * *

UNITED STATES PATENT AND TRADEMARK OFFICE
CERTIFICATE OF CORRECTION

PATENT NO. : 7,729,917 B2
APPLICATION NO. : 11/688939
DATED : June 1, 2010
INVENTOR(S) : Kohtaroh Miyamoto et al.

It is certified that error appears in the above-identified patent and that said Letters Patent is hereby corrected as shown below:

Title page, under (75) Inventors:

Kohtaroh Miyamoto, Fuchu (JP); should read "Kohtaroh Miyamoto, Tokyo (JP);"

Kenichi Arakawa, Inagi (JP); should read "Kenichi Arakawa, Tokyo (JP);"

Toshiya Ohgane, Chofu (JP); should read "Toshiya Ohgane, Tokyo (JP)".

Signed and Sealed this

Sixth Day of July, 2010

David J. Kappos
*Director of the United States Patent and Trademark Office*